United States Patent
Fliam et al.

(10) Patent No.: US 10,848,587 B2
(45) Date of Patent: Nov. 24, 2020

(54) CONTENT DISTRIBUTION NETWORK SUPPORTING POPULARITY-BASED CACHING

(71) Applicant: Comcast Cable Communications, LLC, Philadelphia, PA (US)

(72) Inventors: Richard Fliam, Greenwood Village, CO (US); Kevin Christopher Flanagan, Denver, CO (US); Gregory Allen Broome, Broomfield, CO (US); Jason Burgess, Highlands Ranch, CO (US); Gabriel Commeau, Littleton, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 16/429,902

(22) Filed: Jun. 3, 2019

(65) Prior Publication Data

US 2020/0059534 A1 Feb. 20, 2020

Related U.S. Application Data

(63) Continuation of application No. 14/857,281, filed on Sep. 17, 2015, now Pat. No. 10,356,202, which is a
(Continued)

(51) Int. Cl.
*G06F 15/16* (2006.01)
*H04L 29/08* (2006.01)

(52) U.S. Cl.
CPC .......... *H04L 67/2885* (2013.01); *H04L 67/02* (2013.01); *H04L 67/1097* (2013.01); *H04L 67/2842* (2013.01)

(58) Field of Classification Search
CPC .................................................. H04L 67/2842
See application file for complete search history.

(56) References Cited

U.S. PATENT DOCUMENTS

| 6,874,017 B1 | 3/2005 | Inoue et al. | |
| 7,716,109 B1 * | 5/2010 | Jacobs | G06Q 20/10 705/35 |

(Continued)

OTHER PUBLICATIONS

Extended European Search Report—EP 13153890.2—dated Apr. 11, 2013.
Jul. 17, 2020—Canadian Office Action—CA 2,805,067.

*Primary Examiner* — Hieu T Hoang
(74) *Attorney, Agent, or Firm* — Banner & Witcoff, Ltd.

(57) ABSTRACT

A content delivery network may provide content items to requesting devices using a popularity-based distribution hierarchy. A central analysis system may determine popularity data for a content item stored in a first caching device. At a later time, the central analysis system may determine that a change in the popularity data is beyond a threshold value. The central analysis system may then transmit an instruction to move the content item from the first caching device to a second caching device in a different tier of caching devices than the first caching device. The central analysis system may update a content index to indicate that the content item has been moved to the second caching device. A user device may then be redirected to request the content item directly from the second caching device.

23 Claims, 13 Drawing Sheets

Related U.S. Application Data continuation of application No. 13/590,746, filed on Aug. 21, 2012, now Pat. No. 9,167,049.

(60) Provisional application No. 61/594,017, filed on Feb. 2, 2012.

(56) References Cited

U.S. PATENT DOCUMENTS

| | | | |
|---|---|---|---|
| 7,769,823 B2* | 8/2010 | Jenny | H04L 29/06 709/219 |
| 8,782,236 B1* | 7/2014 | Marshall | G06F 12/0811 709/226 |
| 2002/0087797 A1 | 7/2002 | Adrangi | |
| 2003/0149793 A1* | 8/2003 | Bannoura | H04L 29/06 709/247 |
| 2003/0204529 A1 | 10/2003 | Hertling et al. | |
| 2003/0236961 A1* | 12/2003 | Qiu | G06F 12/122 711/170 |
| 2006/0037037 A1* | 2/2006 | Miranz | H04N 21/6405 725/2 |
| 2007/0089110 A1* | 4/2007 | Li | H04L 67/325 717/178 |
| 2007/0101377 A1* | 5/2007 | Six | H04N 21/6405 725/86 |
| 2008/0071859 A1 | 3/2008 | Seed et al. | |
| 2009/0193064 A1* | 7/2009 | Chen | G06F 16/221 |
| 2009/0199250 A1* | 8/2009 | Assouline | H04N 7/173 725/96 |
| 2009/0254661 A1 | 10/2009 | Fullagar et al. | |
| 2010/0023615 A1* | 1/2010 | Grigsby | H04L 67/104 709/224 |
| 2010/0217869 A1* | 8/2010 | Esteban | H04L 67/2842 709/226 |
| 2010/0312861 A1* | 12/2010 | Kolhi | H04L 67/28 709/219 |
| 2012/0092997 A1* | 4/2012 | Mihaly | H04L 67/28 370/237 |
| 2012/0198075 A1* | 8/2012 | Crowe | H04L 67/2842 709/226 |
| 2012/0254364 A1 | 10/2012 | Vijayan | |
| 2012/0296883 A1 | 11/2012 | Ganesh et al. | |
| 2013/0085864 A1* | 4/2013 | Ahmed | H04W 4/18 705/14.66 |

* cited by examiner

CONTENT DISTRIBUTION NETWORK SUPPORTING POPULARITY-BASED CACHING

CROSS-REFERENCE TO RELATED APPLICATIONS

This application is a continuation of and claims priority to co-pending U.S. application Ser. No. 14/857,281 which claims priority to U.S. application Ser. No. 13/590,746 filed Aug. 21, 2012, and entitled "Content Distribution Network Supporting Popularity-Based Caching," which claims priority to Prov. App. No. 61/594,017, filed Feb. 2, 2012, each of which are incorporated herein by reference in their entirety.

BACKGROUND

Content delivery networks (CDNs) enable provision of content, such as audio and video content, to users. The CDNs typically employ a multi-tiered hierarchy of computer servers, with edge cache servers that serve requests for content from client devices, intermediate or mid-tier cache servers that serve requests from edge cache servers and other mid-tier cache servers, and an origin server that originally stores and supplies the content. The purpose of this hierarchy is to create a scaleout network that can serve a large number of user requests. However, if only one origin server serves each user request, that server would quickly be overloaded if the content it served grew in popularity.

In a typical system, every user request goes through an edge cache server, regardless of the popularity of the content being requested. When the content library being served by the network is very large or has a "long tail," it may become difficult to efficiently manage the edge cache servers. One conventional solution is to use page replacement algorithms, such as Least Recently Used (LRU) or LRU-K, to purge content from a cache server when it has not been recently requested.

When using a page replacement algorithm to purge unpopular content, the content is still served and cached by an edge cache server and any mid-tier cache servers. For example, if an origin server hosts a content library of 1,000 videos, and one of the videos is requested by only one user, the user request is served by the origin server, any mid-tier cache servers, and the edge cache server. If LRU is being used, then not only is the request served by multiple cache servers, but the content is also cached by the cache servers that request it. If a cache server is full, then caching new content requires the purge of already-cached content. No consideration is given to the fact that the purged content may actually be more popular than the newly-cached content. With a sufficiently large content library this may lead to severe cache thrashing. A cache is considered to be thrashing when it is constantly purging and filling content, as opposed to serving from the cache. A severely thrashing cache may put as much load on the network as routing all requests to the origin. It may be very difficult to size an edge cache server appropriately for a large and growing content library.

Accordingly, there remains a need to improve the delivery of content, and to balance that need with the strains on the network.

SUMMARY

Some features described herein relate generally to a hierarchy of storage and processing devices, such as a CDN, that implements a popularity-based distribution hierarchy where content is cached and served based on its popularity. Content need not be replicated across the different vertical tiers of the CDN but may be stored in a particular tier (e.g., a popularity tier) based on its popularity. In some instances, this may significantly decrease the storage required because each content item is only stored once, according to its popularity, as opposed to being stored in multiple places. As a result, a request for content may be routed directly to any individual tier of the CDN where content matching the request is located and need not require that content go through an edge server of the CDN.

In an embodiment, a computing device may determine popularity data for a content item stored in a caching device, such as a cache server. The content item may be, for example, a media content item, such as a video, available for on-demand access by a user device, such as a set top box, television, computer, or mobile phone. The popularity data may be, for example, a popularity ranking value determined by comparing a popularity value of the content item to the respective popularity values of other content items in the CDN's content library. For example, the computing device may determine that the most popular content item in the content library has a popularity ranking value of 1, while the 29th most popular content item in the content library has a popularity ranking value of 29. The popularity values may be based on, for example, the number of received requests (or transmitted streams) for the content item, in which more recent requests or streams are weighted more heavily than older requests or streams.

At a later time, the computing device may determine that a change in the popularity data of the content item has occurred. For example, the content item's popularity ranking value may have increased or decreased over time. The computing device may compare the change in the popularity data to a threshold value, such as a popularity ranking threshold value. The threshold value may be a dynamic threshold value based on the number and size of the content items in the content library and the number and size of the caching devices in the popularity-based distribution hierarchy. If the change in popularity is beyond the threshold value, the computing device may move the content item to another caching device in a different tier of the popularity-based distribution hierarchy.

For example, in response to an increase in popularity beyond the threshold value, the computing device may transmit an instruction to move the content item from a cool caching device, which may be implemented using the origin server, to a hot caching device, which may be implemented using an edge caching device. In another example, in response to a decrease in popularity beyond the threshold value, the computing device may transmit an instruction to move the content item from a hot caching device to a medium caching device. The computing device may then update a content index to update the location information for obtaining the content item. Subsequently, when a request is received from a user device for the content item, the user device may be redirected to request the content item directly from the caching device in the different tier to which the content item has been moved.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
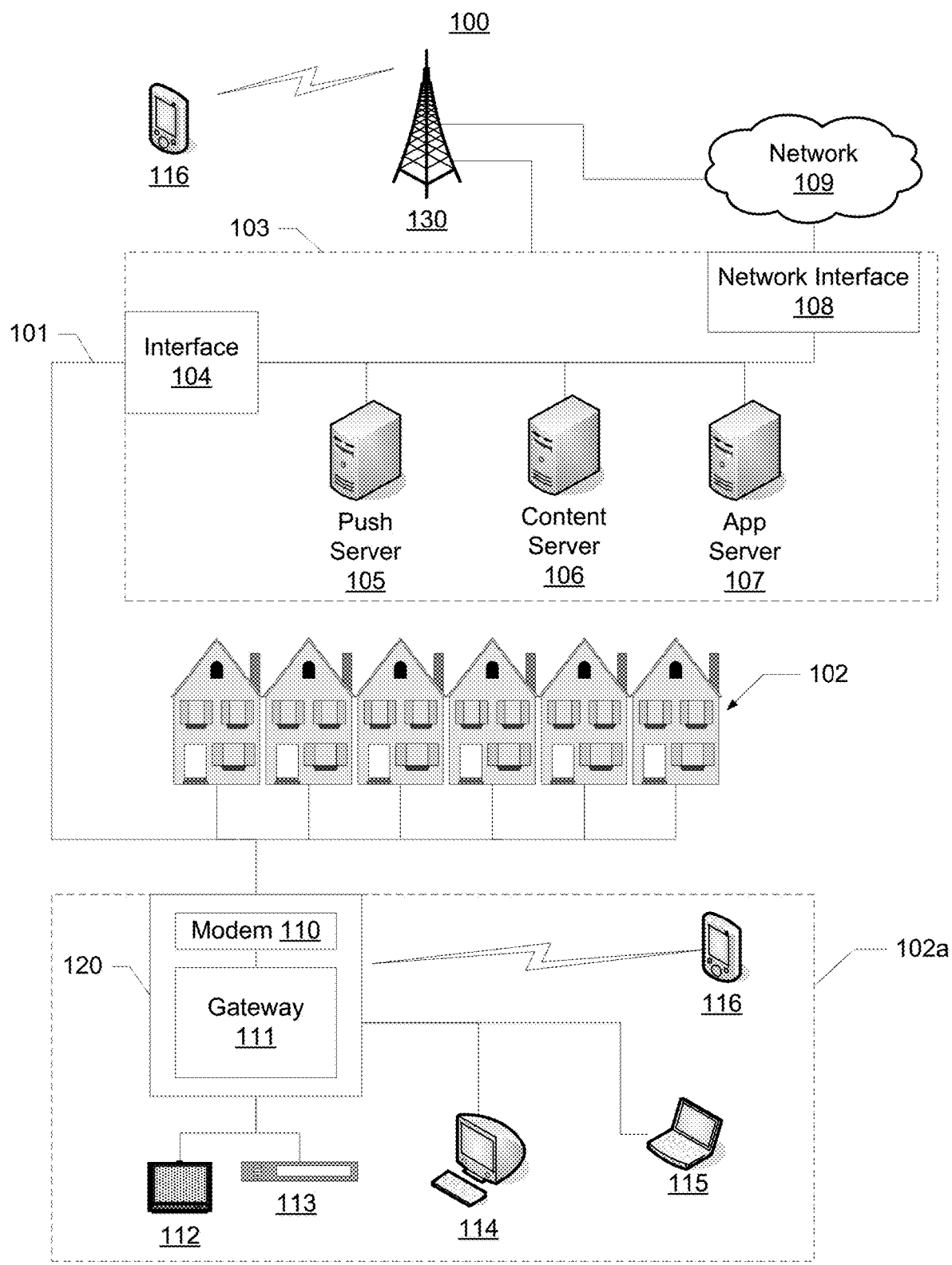
FIG. 1 illustrates an example network environment.

FIG. 1 illustrates an example information distribution network 100 in which many of the various features described herein may be implemented. The illustrated information distribution network is only one example of a suitable network and is not intended to suggest any limitation as to the scope of use or functionality of the disclosure. The illustrated network should not be interpreted as having any dependency or requirement relating to any component or combination of components in an information distribution.

Network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other suitable type of information distribution network or combination of networks. For example, network 100 may be a cellular broadband network communicating with multiple communications access points, such as wireless communications tower 130. In another example, network 100 may be a coaxial system comprising a cable modem termination system (CMTS) communicating with numerous gateway interface devices (e.g., gateway interface device 111 in example home 102a). In another example, the network 100 may be a fiber-optic service system comprising optical fibers extending from an optical line terminal (OLT) to numerous optical network terminals (ONTs) communicatively coupled with various gateway interface devices. In another example, the network 100 may be a digital subscriber line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other suitable network architectures now known or later developed.

Network 100 may use a series of interconnected communication links 101 (e.g., coaxial cables, optical fibers, wireless links, etc.) to connect premises such as homes 102 or other user environments to local office 103. Communication links 101 may include any suitable wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other suitable components for communicating data. Data may include, for example, internet data, voice data, weather data, content data, and any other suitable information. Content data may include, for example, video content, audio content, media on demand, video on demand, streaming video, television programs, text listings, graphics, advertisements, and other content. A content item may represent an individual piece of content, such as a media content item (e.g., a particular movie, television episode, online video clip, song, audio recording, image, or other media content) or any other data. In some instances, a content item may be fragmented into segments, such as a plurality of two-second video fragments that may be separately addressed and retrieved.

Local office 103 may transmit downstream information signals onto communication links 101, and premises such as home 102 may receive and process those signals. In certain implementations, communication links 101 may originate from local office 103 as a single communications path, and may be split into any suitable number of communication links to distribute data to homes 102 and various other destinations. Although the term home is used by way of example, homes 102 may include any type of user environment, such as single family homes, apartment complexes, businesses, schools, hospitals, parks, and other suitable environments and combinations of environments.

Local office 103 may include interface 104, which may be a computing device configured to manage communications between devices on the network of communication links 101 and backend devices, such as server 105, server 106, and server 107. For example, interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in homes 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol networks, cellular communications networks (e.g., Global System for Mobile Communications (GSM), Code Division Multiple Access (CDMA), and any other suitable 2nd, 3rd, 4th and higher generation cellular communications networks), cellular broadband networks, radio access networks, fiber-optic networks, local wireless networks (e.g., Wi-Fi, WiMAX), satellite networks, and any other suitable networks or combinations of networks.

Local office 103 may include a variety of servers that may be configured to perform various functions. Local office 103 may include one or more push servers 105 for generating push notifications to deliver data, instructions, or both to devices that are configured to detect such notifications. For example, push server 105 may transmit an instruction to a device to transfer service from one wireless network or communications access point to another wireless network or communications access point. Local office 103 may include one or more content servers 106 configured to provide content (e.g., media content) to devices. Local office 103 may include one or more application servers 107. For example, application server 107 may be used to implement a caching device, such as a cache server, for the content stored in or provided by content server 106.

Homes 102 may include a single family home, an apartment, an outdoor restaurant, an office suite, or any other suitable indoor environment and extend to an outdoor environment. Example home 102a may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other suitable device or combination of devices. In certain implementations, device 110 may be a part of, or communicatively coupled to, gateway interface device 111. Gateway 111 may be, for example, a wireless router, a set-top box, a computer server, or any other suitable computing device or combination.

Gateway interface device 111 may be any suitable computing device for communicating with device 110 to allow one or more other devices in example home 102a to communicate with local office 103, one or more external networks 109, or other devices communicatively coupled thereto. Gateway 111 may include local network interfaces to provide communication signals to user devices in or near example home 102a, such as television 112, set-top box 113, personal computer 114, laptop computer 115, wireless device 116 (e.g., a wireless laptop, a tablet computer, a mobile phone, a portable gaming device), vehicular computing system 117 (e.g., a mobile computing system, navigation system, or entertainment system in an automobile, marine vessel, or aircraft) and any other suitable device.

Figure 2:
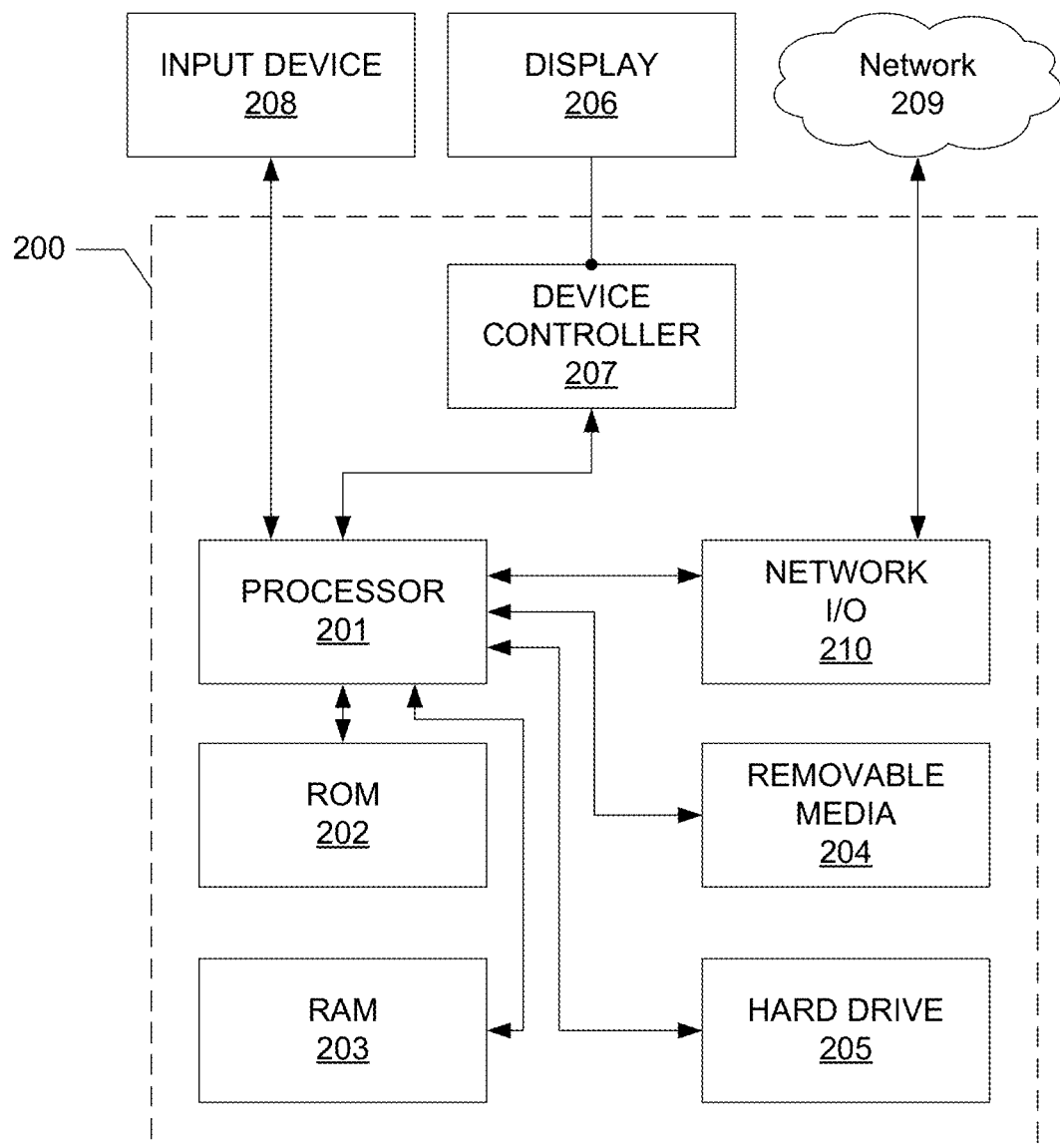
FIG. 2 illustrates an example software and hardware device on which various elements described herein can be implemented.

FIG. 2 illustrates general hardware elements and software elements that can be used to implement any of the various computing devices and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

Device 200 may include one or more output devices, such as a display 206, such as an external monitor or television, and may include one or more output device controllers 207, such as a video processor. In some embodiments, device 200 may include one or more user input devices 208, such as a remote control, keyboard, mouse, touch screen, microphone, or any other suitable input device.

Device 200 may also include one or more network interfaces, such as network input/output (I/O) interface 210 to communicate with an external network 209. The network interface may be a wired interface, wireless interface, or a combination of the two. In some embodiments, network I/O interface 210 may include a cable modem, and network 209 may include the communication links 101 shown in FIG. 1, one or more external networks 109, an in-home network, a provider's wireless, coaxial, fiber, or hybrid fiber/coaxial distribution system (e.g., a DOCSIS network), or any other desired network.

Figure 3A:
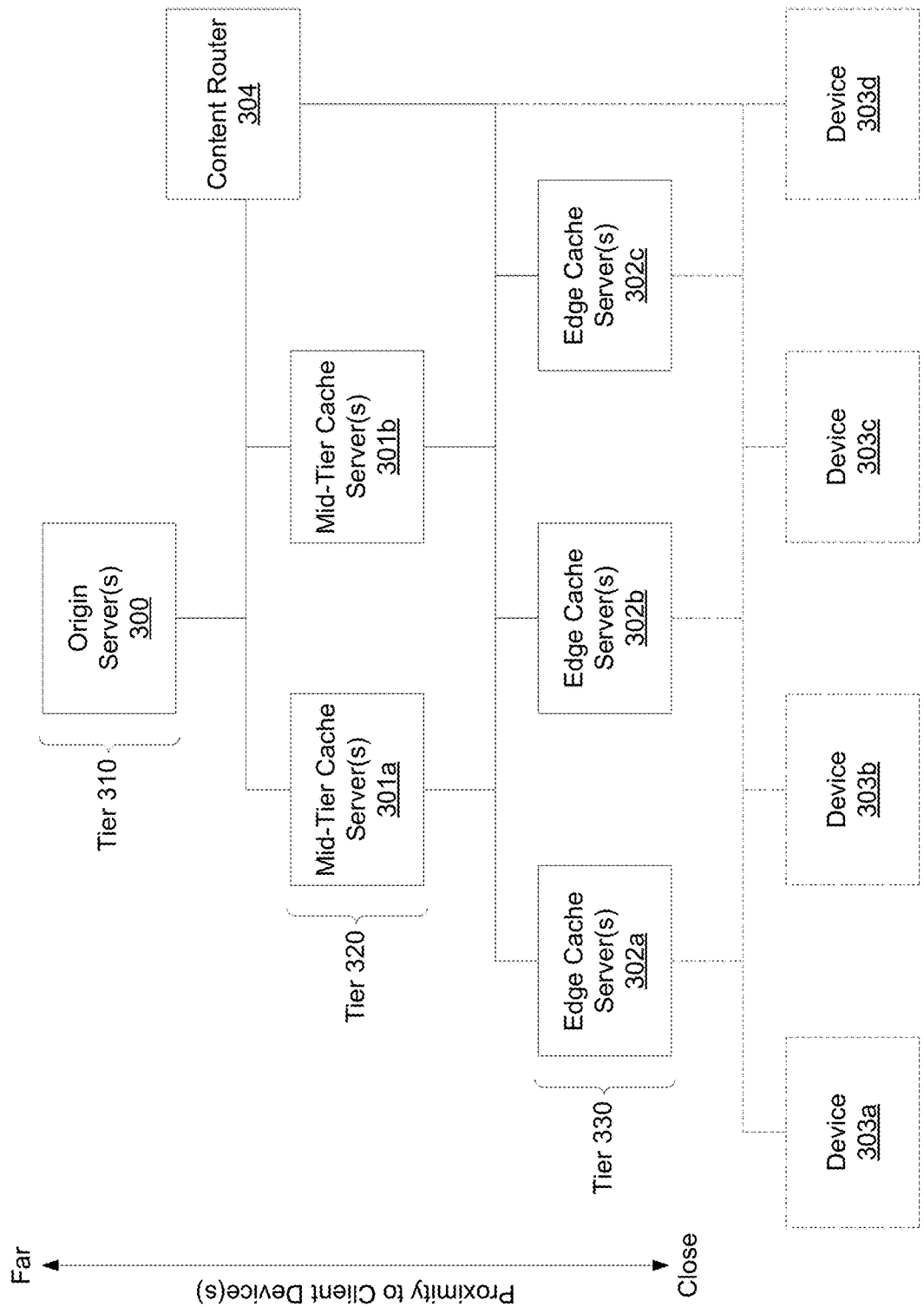
FIGS. 3A-3B illustrate an example content delivery network.
Figure 3B:
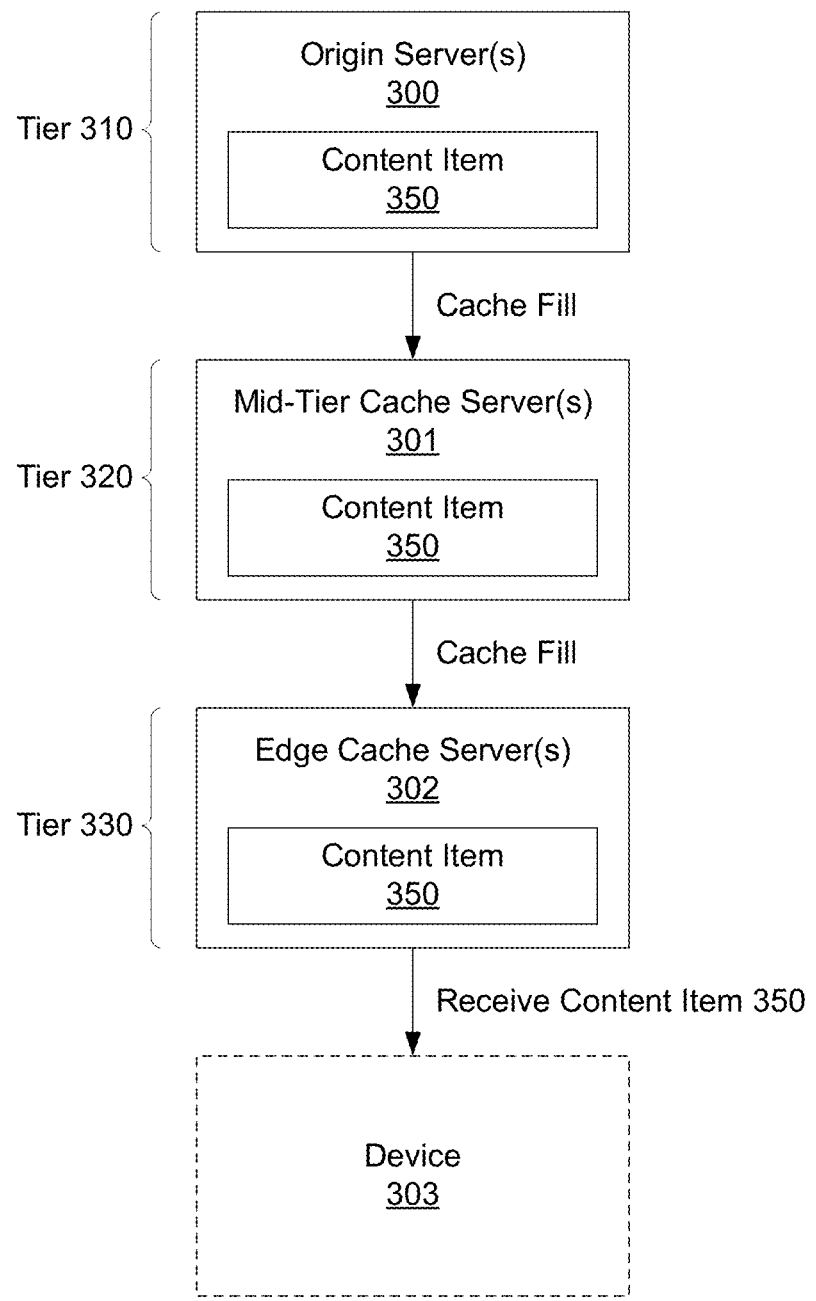

FIGS. 3A-3B illustrates an example distribution hierarchy for a content delivery network (CDN). After a content item is requested by a client device, such as one of client devices 303a-d, it is replicated from the origin of the CDN, such as one or more origin servers 300 in tier 310, downward through tiers of lower-tier cache servers, such as mid-tier cache servers 301a-b in tier 320 and edge cache servers 302a-c in tier 330. In some arrangements, mid-tier cache servers 301 may include multiple tiers or layers of cache servers (e.g., in tiers different from tier 320). The various components shown in FIGS. 3A-3B may be implemented using any suitable hardware, software, or both, such as device 200 shown in FIG. 2.

One or more origin servers 300 may store the original copy of a content item, such as a movie or other data available for on-demand access by client devices 303a-d. Origin server 300 may also establish the distribution hierarchy used to cache and distribute its content. For example, origin server 300 may transmit messages to one or more cache servers requesting that they cache origin server 300's content, and instructing each cache server as to where it should be positioned in the distribution hierarchy. Although FIG. 3A illustrates a single origin server 300 for a given distribution hierarchy, the CDN may include multiple origin servers located in the same or different tiers as origin server 300. In some instances, each individual content item may have its own distribution hierarchy. As a result, a single server may act as both an origin server for one content item and a mid-tier cache server for another content item.

To facilitate distribution of the content, one or more mid-tier cache servers 301a-b and edge cache servers 302a-c may be communicatively coupled to origin server 300, and each server may store a copy of the file(s) containing the content of the origin server 300, such as a copy of the movie files for an on-demand movie. Edge cache servers 302a-c may serve requests for content items from client devices 303a-d and rely on higher lever servers, such as mid-tier cache servers 301a-b and origin server 300, to supply source files for the content and to establish access authorization parameters for the content. Mid-tier cache servers 301a-b and origin server 300 may refrain from interaction with client devices 303a-d, and may instead limit their communications to serving requests from edge cache servers 302a-c or other servers in the CDN.

The CDN may also include one or more content routers 304 for facilitating communications between the servers of the distribution hierarchy. Content router 304 may be communicatively coupled to all of the cache servers in the CDN, but need not be a part of the distribution hierarchy. For example, content router 304 may receive a request for a content item from one of client devices 303a-d and redirect the client device to request the content item from one of edge cache servers 302a-c. Content router 304 may select the edge cache server based on the ability of the edge cache server to serve the requested content item, the proximity between the client device and the edge cache server, and the relative load of the edge cache server. Proximity may be, for example, network proximity, geographic proximity, or a combination of the two. For example, the proximity between client devices 303a-d and edge cache servers 302a-c in tier 330 may be closer than the proximity between client devices 303a-d and origin server 300 in tier 310.

As illustrated in FIG. 3B, the hierarchy of caching servers may be used to assist with the distribution of media content by servicing requests for that content on behalf of the content's source. For example, client device 303 may initially request content item 350 from edge cache server 302. Edge cache server 302 may determine that it does not possess content item 350 and request content item 350 from mid-tier cache server 301. Mid-tier cache server 301 may also determine that it does not possess content item 350 and request it from origin server 300. Origin server 300, which serves as the source for content item 350, may receive the request and transmit content item 350 to mid-tier cache server 301, which may in turn transmit content item 350 to edge cache server 302. Edge cache server 302 may then transmit content item 350 to client device 303.

In the CDN of FIGS. 3A-3B, every request for content is routed to an edge cache server regardless of the popularity of the content being requested. Since each request is served by one or more origin servers 300, one or more origin servers 300 may quickly become overloaded if content item 350 increases in popularity. Further, when the content library being served by the CDN is very large or has a "long tail" of mid-tier cache servers, it may become difficult to efficiently size the edge cache servers 302a-c. Thus, improved systems, apparatuses, and methods for providing content are discussed with reference to FIGS. 4-8.

Figure 4A:
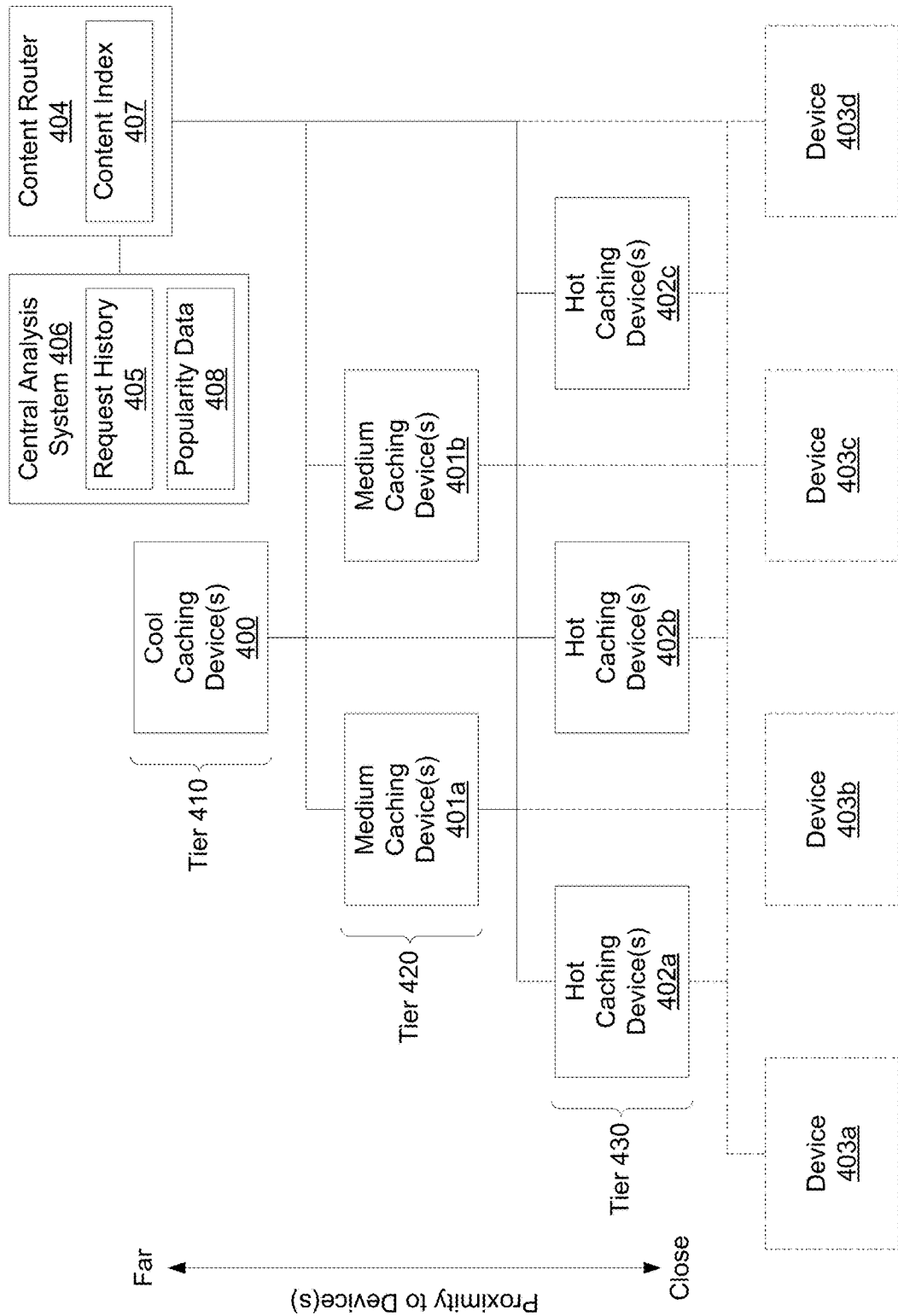
FIGS. 4A-4C illustrate another example content delivery network.
Figure 4B:
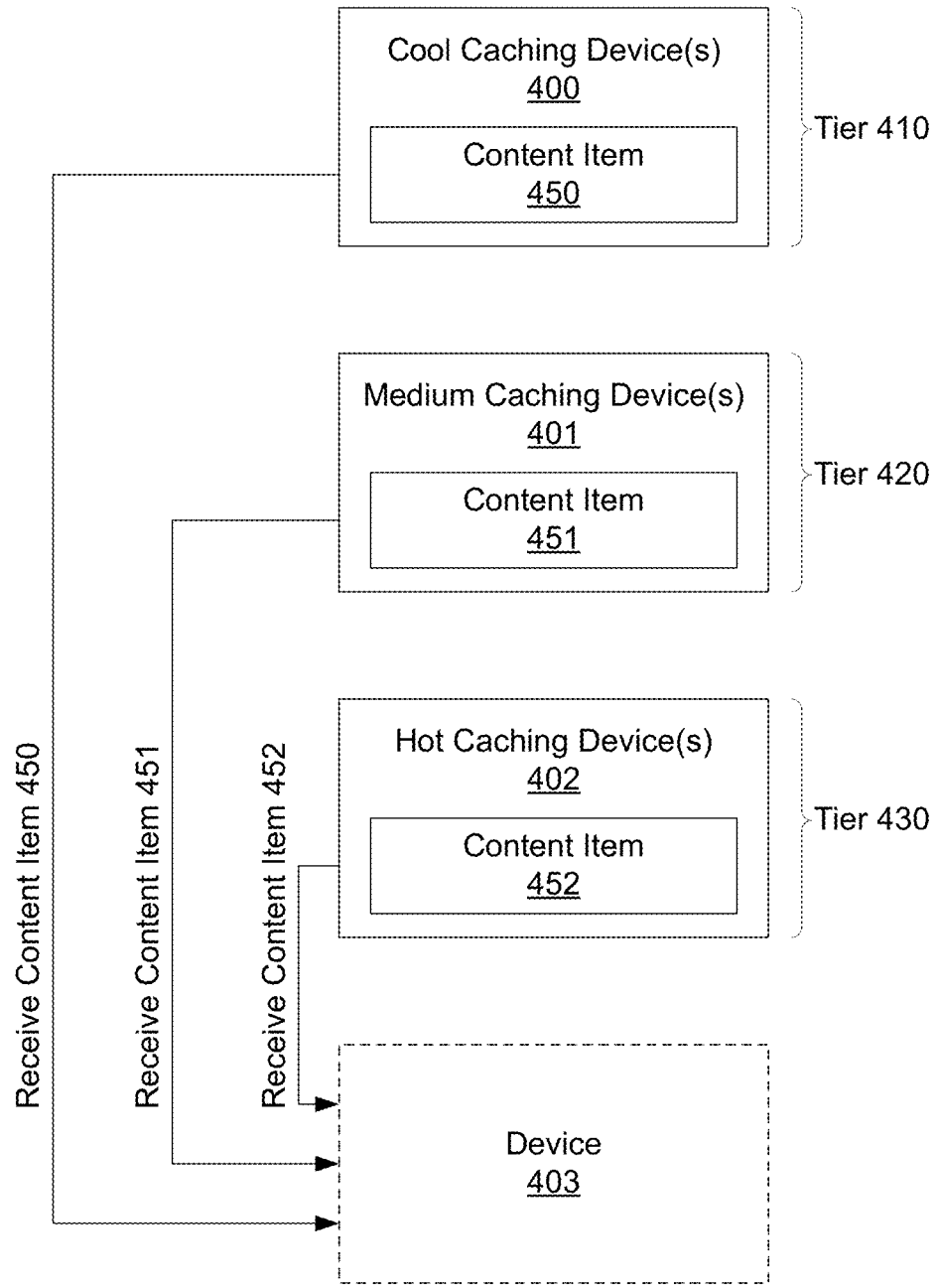
Figure 4C:
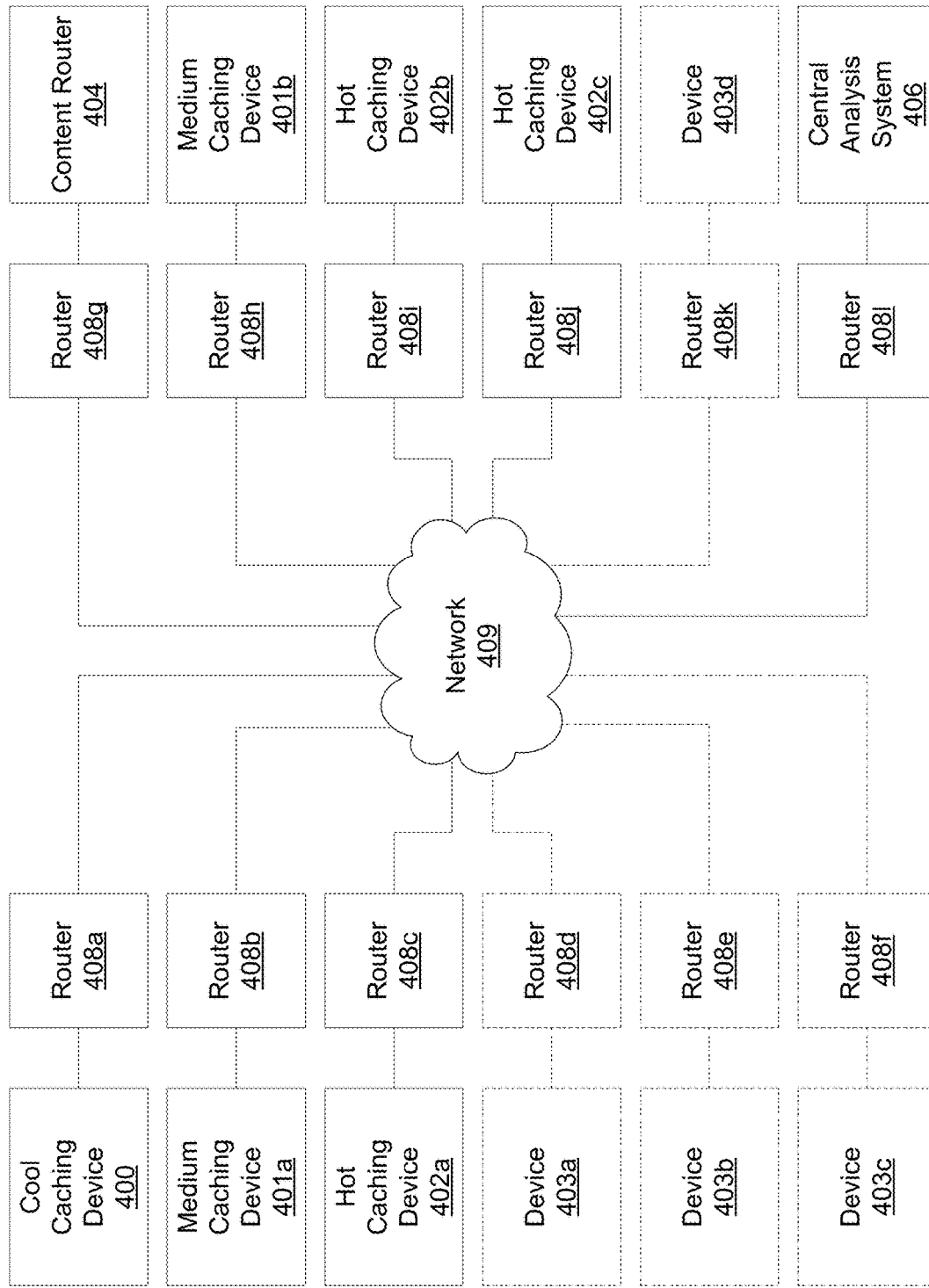

FIGS. 4A-4C illustrate an exemplary popularity-based distribution hierarchy for a CDN where a content item, such as a media content item, requested by a device, such as a user device, is transmitted to the device directly from its source without replication across intermediate tiers of the distribution hierarchy. The source location may be selected as a function of the popularity of the content item. The various components and processes described with reference to FIGS. 4A-4C may be implemented using any suitable hardware, software, or both, such as device 200 shown in FIG. 2.

One feature of the popularity-based distribution hierarchy of FIGS. 4A-4C is that content providers may increase the size of the content library available to their users. The disclosed features allow content providers to offer more content to users without requiring significant new hardware deployment by moving from a CDN model based on replication of content items across vertical tiers of cache servers, such as the CDN of FIGS. 3A-3B, to a model where subsets of content items are cached and served from particular popularity tiers of caching devices, such as cache servers, based on popularity, such as the CDN of FIGS. 4A-4C. In an illustrative example, cool caching device 400 in tier 410 may be implemented using origin server 300 in tier 310, medium caching devices 401a-b in tier 420 may be implemented using mid-tier cache servers 301a-b in tier 320, and hot caching devices 402a-c in tier 430 may be implemented using edge cache servers 302a-c in tier 330. This may significantly decrease the storage required because each content item may only be stored once in a popularity tier, according to its popularity, as opposed to being stored in multiple places. This may also effectively partition the CDN's content library across a logical distribution hierarchy, allowing each tier of the popularity-based distribution hierarchy to function on a subset of the total content items.

As illustrated in FIG. 4A, the popularity-based distribution hierarchy may include hot caching devices 402a-c in tier 430, medium caching devices 401a-b in tier 420, and cool caching device 400 in tier 410. Popular content items may be cached and served by hot caching devices 402a-c. Modestly popular content items may be cached and served by medium caching devices 401a-b. Unpopular content items, such as "long tail" content items, may be cached and served directly by cool caching device 400 or an origin server. The proximity (e.g., network proximity, geographic proximity, or a combination of the two) between devices 403a-d (e.g., user devices, client devices) and hot caching devices 402a-c may be closer than the proximity between devices 403a-d and medium caching devices 401a-b, and the proximity between devices 403a-d and medium caching devices 401a-b may be closer than the proximity between devices 403a-d and cool caching device 400.

In some embodiments, the CDN does not replicate a content item across caching devices in different popularity tiers, such as tiers 410, 420, and 430, of the popularity-based distribution hierarchy but may replicate the content item across caching devices in the same tier. For example, hot caching devices 402a-c may store copies of a popular content item, medium caching devices 401a-b may cache and serve copies of a modestly popular content item, and cool caching device 400 may cache and serve copies of an unpopular content item. A content item cached in hot caching devices 402a-c in tier 430 may not be replicated to medium caching devices 401a-b in tier 420 or to cool caching device 400 in tier 410. The content item may be replicated to other hot caching devices in tier 430.

The CDN may include content router 404 for receiving requests for content items from devices 403a-d and for redirecting devices to the tier of hot, medium, or cool caching devices where the content item is stored. Content router 404 may be communicatively coupled to all of the caching devices in the CDN, but need not be a part of the popularity-based distribution hierarchy or located in any particular tier. For example, the content router may be located anywhere in the CDN and may not serve content. In another example, content router 404 may be implemented as a logical server using a portion of the hardware used to implement a different server, such as cool caching device 400.

To facilitate the popularity-based distribution hierarchy, content router 404 may store content index 407. Content index 407 may be or have access to a database that includes, for example, location information for obtaining each of the content items in the CDN's content library. When a content item is moved to a different tier of caching devices, content index 407 may be updated with new location information for obtaining the content item.

Content router 404 may redirect a device to request a content item from a particular caching device or tier of caching devices using any suitable technique, such as by transmitting a Hypertext Transfer Protocol (HTTP) 302 redirect instruction. For example, content router 404 may receive a request for a content item from device 403a, access content index 407 to determine where the content item should be served from, and transmit an HTTP 302 redirect instruction to device 403a to redirect it to one of hot caching devices 402a-c in tier 430, medium caching devices 401a-b in tier 420, or cool caching device 400 in tier 410 based on where the content item should be served from. In another example, content router 404 or caching devices 400, 401a-b, 402a-c may dynamically redirect a device to a different tier of caching devices if the popularity of a content item changes while it is being downloaded by the device. Dynamic redirection of a request to a caching device in a different tier will be discussed further with reference to FIGS. 5A-5B and FIGS. 6A-6B.

The CDN may include central analysis system 406 for determining the respective popularities of the content items in the CDN's content library and for moving one or more of the content items to a hot, medium, or cool caching device based on their respective popularities. The popularity of a content item may correspond to a popularity value, a popularity ranking value, or any other suitable value indicative of the content item's popularity. Central analysis system 406 may be communicatively coupled to content router 404, but need not be a part of the popularity-based distribution hierarchy or located in any particular tier.

Central analysis system 406 may store or have access to request history 405 for use in determining popularity information, such as popularity data 408. Request history 405 may comprise a database that includes information received from content router 404, such as, for example, a history of all requests received for each of the content items in the CDN's content library, a history of all streams of the content items transmitted to devices 403*a-d*, or any other suitable information. For example, request history 405 may include, for each content item, one or more content item identifiers, such as a uniform resource identifier (URI), in association with the respective dates and times that the content item was requested, streamed, or both. The content item identifier may be, for example, a uniform resource identifier (URI) comprising a string of characters used to identify the content item, such as the URI "http://videocontent.net/movies/Avatar/140880/movie-1" corresponding to the motion picture Avatar or a unique fragment of the motion picture Avatar. Popularity data 408 may include, for example, popularity values and popularity ranking values for each content item in the CDN's content library. For example, popularity data 408 may store, for each content item, a content item identifier in association with popularity values, popularity rankings, and the respective dates and times that the each of the popularity values, popularity rankings, or both were determined.

Central analysis system 406 may determine a respective popularity value for each content item in the CDN's content library using any suitable technique. For example, central analysis system 406 may determine a popularity value p for a content item based on its request history as shown in Equation 1:

$$p = \frac{N}{t} \quad (1)$$

where N represents the number of requests for the content item in a given period of time t. In one variation, N may represent the number of streams of the content item transmitted from the CDN's caching devices to various devices in a given period of time t.

In another embodiment, central analysis system 406 may determine a popularity value for a content item by weighting more recent popularity over older popularity, such as by implementing a reduction factor against older requests. For example, central analysis system 406 may determine a popularity value p for a particular content item based on the number of requests (or streams) for the content item as a function of time as shown in Equation 2:

$$p = \sum_{i=f(j)} \frac{N_j}{j} \quad (2)$$

where j is an integer value, j represents j-th time duration (e.g., the last minute, the last hour, one to two hours ago, etc.), and $N_j$ represents the number of requests (or streams) for the content item during the j-th time duration. For example, central analysis system 406 may determine that a first content item that received 300 requests during the last minute, 400 requests one to two minutes ago, and 600 requests two to three minutes ago has a popularity value $p_1$ as shown in Equation 3:

$$p_1 = \sum_{j=1}^{3} \frac{N_j}{j} = \frac{300}{1} + \frac{400}{2} + \frac{600}{3} = 700.00 \quad (3)$$

In another example, central analysis system 406 may determine that a second content item that was streamed to 600 devices during the last minute, 400 devices one to two minutes ago, and 300 devices two to three minutes ago has a popularity value $p_2$ as shown in Equation 4:

$$p_2 = \sum_{j=1}^{3} \frac{N_j}{j} = \frac{600}{1} + \frac{400}{2} + \frac{300}{3} = 900.00 \quad (4)$$

Central analysis system 406 may determine a respective popularity ranking value for each content item by comparing its respective popularity value to the respective popularity values of other content items in the content library. For example, central analysis system 406 may determine a popularity ranking value r for each of the content items by sorting their respective popularity values from greatest to least. To continue the aforementioned example, if the content library includes only the first and second content items, central analysis system 406 may determine that the second content item has a popularity ranking value r=1 and the first content item has a popularity ranking value r=2 because the second content item's popularity value $p_2$ is greater than the first content item's popularity value $p_1$.

Central analysis system 406 may determine whether a content item is popular, modestly popular, or unpopular based on popularity data 408. For example, central analysis system 406 may determine whether a content item is popular, modestly popular, or unpopular based on its popularity value, ranking value, or both. In some instances, central analysis system 406 may perform the determination in real-time or near real-time (e.g., every 2 seconds) to accommodate rapid increases or decreases in the number of the requests from devices 403*a-d*.

Popular content items may correspond to content items with a popularity value above a first popularity threshold value or a popularity ranking above a first popularity ranking threshold value. For example, central analysis system 406 may determine that content items with a popularity value p greater than or equal to a popularity threshold value of 100.00 may be popular. In another example, central analysis system 406 may determine that content items with a popularity ranking value r less than or equal to a popularity ranking threshold value of 14 (e.g., the 14 most popular content items) may be popular.

Unpopular content items may correspond to content items with a popularity value below a second popularity threshold value or a popularity ranking below a second popularity ranking threshold value. For example, central analysis system 406 may determine that content items with a popularity value p greater less than or equal to a popularity threshold value of 2.00 may be unpopular. In another example, central analysis system 406 may determine that content items with a popularity ranking value r greater than or equal to a popularity ranking threshold value of 30 (e.g., the 30th to the least popular content items) may be unpopular.

Modestly popular content items may correspond to content items with a popularity value between the first and second popularity threshold values or a popularity ranking between the first and second popularity ranking threshold values described above. For example, central analysis system 406 may determine that content items with a popularity value p between a first popularity threshold value of 2.00 and a second popularity threshold value of 100.00 may be modestly popular. In another example, central analysis system 406 may determine that content items with a popularity ranking value r between a first popularity ranking threshold value of 14 and a second popularity ranking threshold value of 30 (e.g., the 15th to 29th most popular content items) may be modestly popular. In some embodiments, there may be more or fewer than three tiers of popularity (e.g., n-tiers, where n is an integer value), and content items may go through a smoothing function to prevent them from bouncing rapidly between tiers in time.

In some aspects, popularity may be a first-pass selection filter for determining where to store particular content items. For example, once central analysis system 406 determines that a content item is a popular content item, it may filter a list of eligible hot caching devices based on the ability of each hot caching device to serve the requested content item, the proximity between one or more devices and the hot caching device, and the relative load of the hot caching device. For example, the threshold values discussed above may be dynamic threshold values based on the number and sizes of the content items in the content library and the number and sizes of the caching devices in the CDN. Dynamic thresholds will be discussed further with reference to FIG. 7.

Central analysis system 406 may move content items to different popularity tiers of caching devices in the popularity-based distribution hierarchy using any suitable technique, such as by transmitting instructions to the caching devices via content router 404. For example, central analysis system 406 may move popular content items to hot caching devices 402a-c in tier 430, modestly popular content items to medium caching devices 401a-b in tier 420, and unpopular content items to cool caching device 400.

Central analysis system 406 may move a content item to a different tier of caching devices if the popularity of the content item changes while it is being downloaded by one or more devices. For example, a content item may be served by a cool cache when a device initially begins to download it. If central analysis system 406 determines that a movie has suddenly become modestly popular or popular, it may move the movie to a medium caching device or hot caching device. Central analysis system 406 may then signal the caching device to dynamically redirect the device to request the movie from the medium or hot caching device for downloading the remainder of the movie. This redirection may go through the content router, the caching device, or the device itself. This means that a sudden increase in the popularity of a content item may, in some instances, avoid overloading a cool caching device or create sudden large network load. Movement of a content item to a different tier of caching devices while it is being downloaded by a device will be discussed further with reference to FIGS. 5A-5B and FIGS. 6A-6B.

Content router 404 may update content index 407 with new location information for obtaining the original copies of the content items when they are moved to the different tiers of caching devices. Content router 404 may access the updated content index 407 for use in redirecting devices 403a-d to the appropriate hot, medium, or cool caching device where the original copy of the content item is stored. For example, content router 404 may receive a request for a content item from one of devices 403a-d and access content index 407 to determine whether the requested content item is stored in a hot caching device, a medium caching device, or a cool caching device. If content router 404 determines that the requested content item is stored in a tier of hot caching devices, it may redirect the device to request the content item from one of hot caching devices 402a-c. If content router 404 determines that the requested content item is stored in a tier of medium caching devices, it may redirect the device to request the content item from one of medium caching devices 401a-b. If content router 404 determines that the requested content item is stored in a cool caching device or a tier of cool caching devices, it may redirect the device to request the content item from cool caching device 400.

In some embodiments, the path or location for accessing the content item may be determined dynamically, rather than being statically predetermined. For example, when a caching device (e.g., caching device 402a) becomes overloaded, it may remove itself from a list of eligible caching devices to serve a particular content item. Subsequently, a new caching device (e.g., caching device 401a) may be selected to serve that content item. When the overloaded caching device is no longer overloaded, it may be placed on the list of eligible caching devices again and requests for that content item may again be redirected to the initial caching device.

In one embodiment, the CDN may implement an initial popularity-based distribution hierarchy where all of the content items in the content library are stored in hot caching devices 402a-c and assumed to be equally popular. For example, central analysis system 406 may assign, in popularity data 408, a popularity value of 99999.99, a popularity ranking of 1, or both to every content item in the content library. As a result, content router 404 may initially route all requests for content items from devices 403a-d to hot caching devices 402a-c in tier 430. As time progresses and request history 405 grows larger, central analysis system 406 may determine that some of the initially popular content items may have become modestly popular or unpopular based on their respective popularity decreasing relative to other content items. Central analysis system 406 may move the modestly popular content items to medium caching devices 401a-b in tier 420 and the unpopular content items to cool caching device 400 in tier 410. Content router 404 may then redirect subsequent requests for the content items to the hot, medium, or cool caching device where the content item is stored.

In another embodiment, the CDN may implement an initial popularity-based distribution hierarchy where all of the content items in the content library are stored in cool caching device 400 and assumed to be equally unpopular. For example, central analysis system 406 may assign, in popularity data 408, a popularity value of 0.00, a popularity ranking of 99999, or both to every content item in the content library. As a result, content router 404 may initially route all requests for content items from devices 403a-d to cool caching device 400 in tier 410. As time progresses and request history 405 grows larger, central analysis system 406 may determine that some of the initially unpopular content items may have become modestly popular or popular based on their respective popularity increasing relative to other content items. Central analysis system 406 may move the modestly popular content items to medium caching devices 401*a-b* in tier 420 and the popular content items to hot caching devices 402*a-c* in tier 430. Content router 404 may then redirect subsequent requests for the content items to the hot, medium, or cool caching device where the content item is stored. In some embodiments, popularity values may also be initialized by other sources, such as box office popularity, viewership data for television shows, social media trending data, or any other suitable information from other asset distribution services.

As illustrated in FIG. 4B, the popularity-based distribution hierarchy may allow device 403 to request and receive an unpopular content item, such as unpopular content item 450, directly from cool caching device 400. Device 403 may request and receive a modestly popular content item, such as modestly popular content item 451, directly from medium caching device 401. Device 403 may request and receive a popular content item, such as popular content item 452, directly from hot caching device 402.

In some aspects, the physical arrangement of the servers in the popularity-based distribution hierarchy may differ from FIG. 4A. As illustrated in FIG. 4C, each of the caching devices may be coupled through one or more communication networks 409 via a respective router 408*a*-1. One or more communication networks 409 may include the communication links 101 shown in FIG. 1, one or more external networks 109, one or more external networks 209 shown in FIG. 2, or any other suitable network or combination of networks. Routers 408*a*-1 may contain the necessary routing tables and address information to transmit messages to other devices coupled to one or more communication networks 409, such as the content router, central analysis system, other caching devices and other devices in the CDN.

Figure 5A:
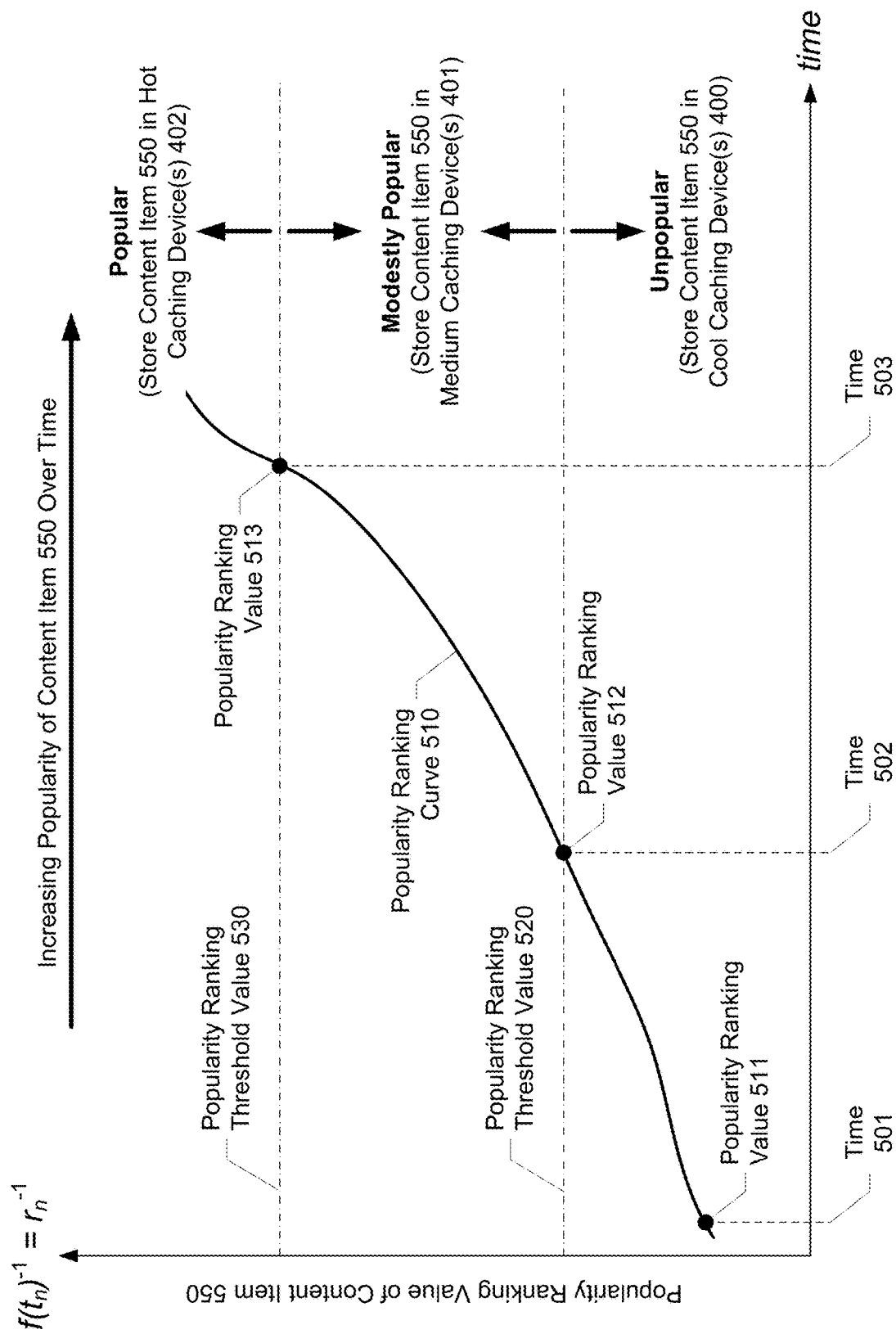
FIGS. 5A-5B illustrate an example technique for providing a content item.
Figure 5B:
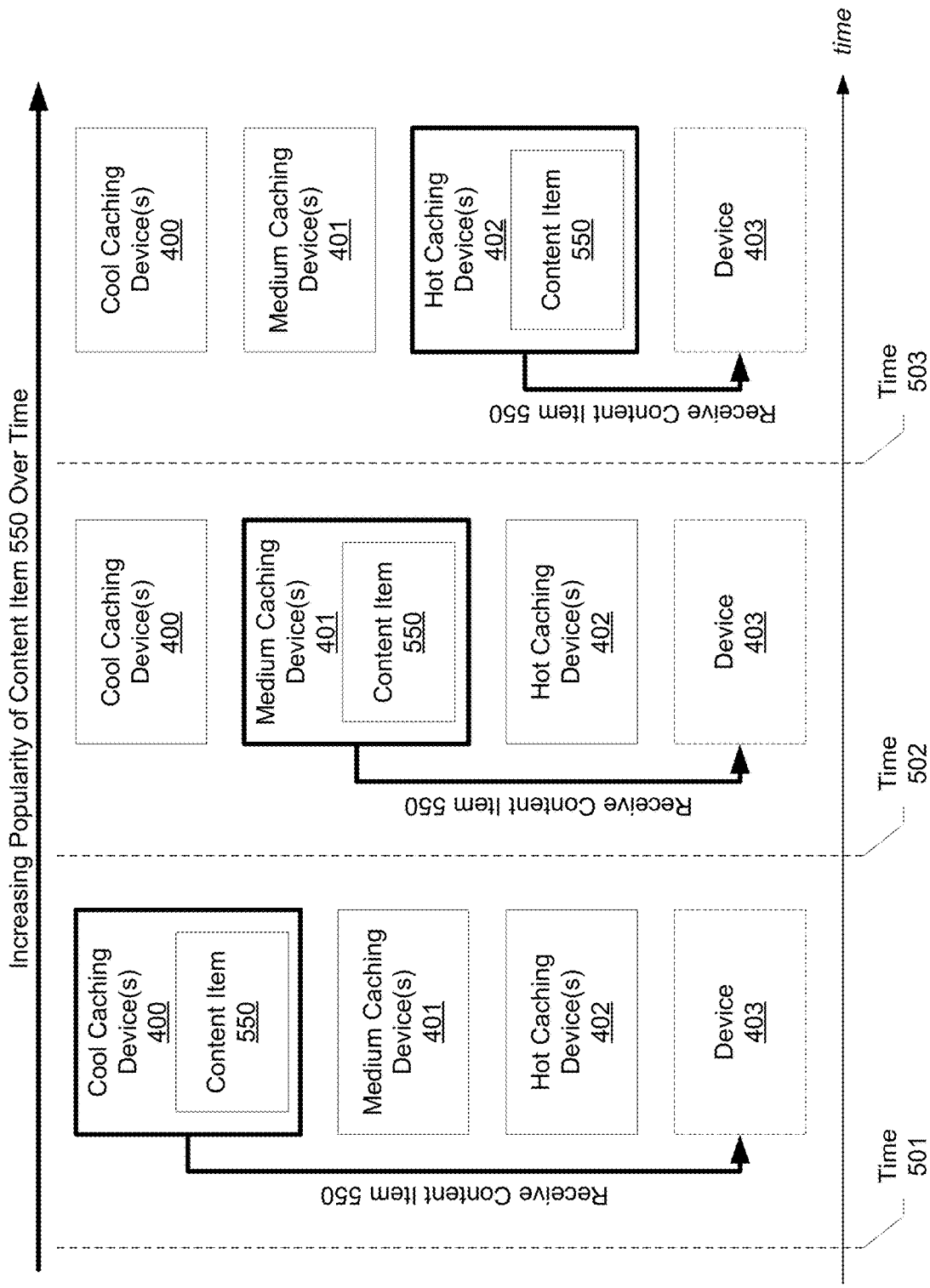

FIGS. 5A-5B illustrate an exemplary technique for moving a content item, such as content item 550, to a different tier of caching devices and dynamically redirecting a device to the different tier of caching devices if the popularity of the content item increases while it is being downloaded by the device. The technique illustrated in FIGS. 5A-5B may be implemented, for example, using the example popularity-based distribution hierarchy of FIGS. 4A-4C. The various components and processes described with reference to FIGS. 5A-5B may be implemented using any suitable hardware, software, or both, such as device 200 shown in FIG. 2. For purposes of illustration, popularity ranking value as a function of time $f(t_n)=r_n$ is represented as $f(t_n)^{-1}=r_n^{-1}$ such that the inverse of the popularity ranking value increases as the popularity of content item 550 increases over time (i.e., as the numerical value of the popularity ranking value r decreases).

As illustrated in FIG. 5A, content item 550 may have an increasing popularity ranking value $r^{-1}$ over time as indicated by popularity ranking curve 510. The central analysis system may determine popularity ranking value $r^{-1}$ as a function of time using any suitable technique, such as by comparing its respective popularity value p to the respective popularity values of other content items in the content library. For example, the central analysis system may determine that content item 550 has a popularity ranking value 511 at time 501, a popularity ranking value 512 at time 502, and a popularity ranking value 513 at time 503. The central analysis system may also store popularity ranking threshold value 520 and popularity ranking threshold value 530. One or both of popularity ranking threshold values 520 and 530 may be dynamic threshold values determined by the central analysis system based on, for example, the number and sizes of the content items in the content library and the number and sizes of the caching devices in the CDN.

In an illustrative example, content item 550 may initially be an unpopular content item stored in cool caching device 400. At time 501, the central analysis system may determine that content item 550 has a popularity corresponding to popularity ranking value 511. At time 502, the central analysis system may determine that content item 550 has a popularity corresponding to popularity ranking value 512, which may be a popularity ranking value $r^{-1}$ equal to or greater than popularity ranking threshold value 520. As a result, the central analysis system may determine that content item 550 is a modestly popular content item and move content item 550 from cool caching device 400 to medium caching device 401. Subsequently, at time 503, the central analysis system may determine that content item 550 has a popularity corresponding to popularity ranking value 513, which may be a popularity ranking value $r^{-1}$ equal to or greater than popularity ranking threshold value 530. As a result, the central analysis system may determine that content item 550 is a popular content item and move content item 550 from medium caching device 401 to hot caching device 402.

As illustrated in FIG. 5B, the central analysis system may signal the caches or clients to dynamically redirect a request for content item 550 or portions thereof to one or more cool caching devices 400, one or more medium caching devices 401, or one or more hot caching devices 402 based on where content item 550 is stored at a particular point in time. For example, at time 501, device 403 may request and receive a first portion of content item 550 directly from cool caching device 400. The first portion may correspond to, for example, the first five segments (e.g., the first 10 seconds) of a movie that has been segmented into two-second video fragments. At time 502, the content router may redirect the device's request for a second portion of content item 550 to medium caching device 401. The second portion may correspond to, for example, the next two segments (e.g., the next 11-14 seconds) of the movie. As a result, device 403 may request and receive the second portion of content item 550 directly from medium caching device 401. At time 503, the content router may redirect the device's request for a third portion of content item 550 to hot caching device 402. The third portion may correspond to, for example, the remaining segments (e.g., seconds 15 onward) of the movie until the entire movie is received by device 403 or until device 403 is redirected to request a subsequent portion of the movie from a medium or cool caching device. As a result, device 403 may request and receive the third portion of content item 550 directly from hot caching device 402.

Figure 6A:
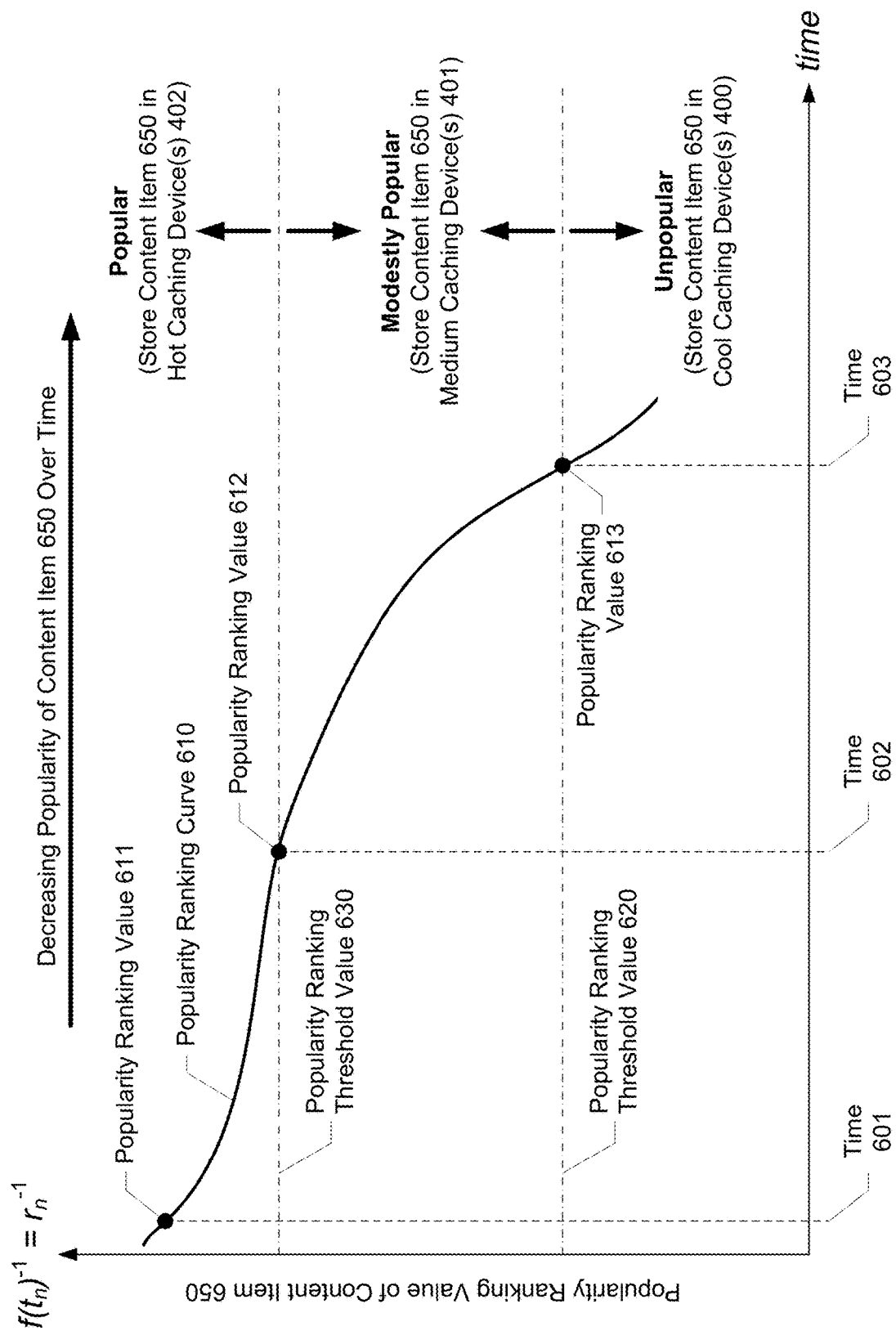
FIGS. 6A-6B illustrate another example technique for providing a content item.
Figure 6B:
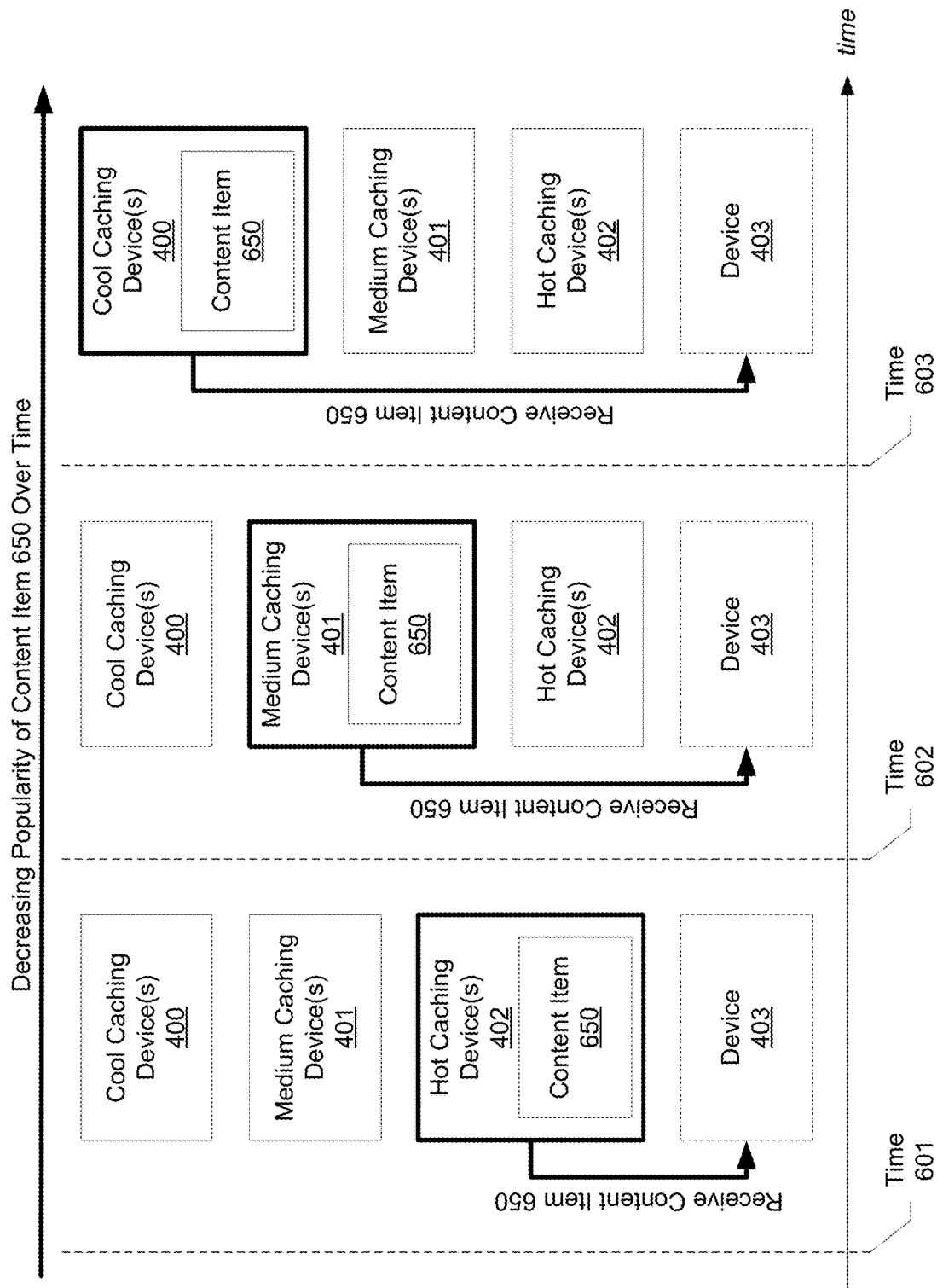

FIGS. 6A-6B illustrate an exemplary technique for moving a content item, such as content item 650, to a different tier of caching devices and dynamically redirecting a device to the different tier of caching devices if the popularity of the content item decreases while it is being downloaded by the device.

As illustrated in FIG. 6A, content item 650 may have a decreasing popularity ranking value $f(t_n)=r_n$ over time as indicated by popularity ranking curve 610, where $f(t_n)=r_n$ is represented as $f(t_n)^{-1}=r_n^{-1}$ for purposes of illustration. For example, the central analysis system may determine popularity ranking value 611 at time 601, popularity ranking value 612 at time 602, and popularity ranking value 613 at time 603. The central analysis system may also store popularity ranking threshold value 620 and popularity ranking threshold value 630. One or both of popularity ranking threshold values 620 and 630 may be dynamic threshold values determined by the central analysis system based on, for example, the number and sizes of the content items in the content library and the number and sizes of the caching devices in the CDN.

In an illustrative example, content item 650 may initially be a popular content item stored in hot caching device 402. At time 601, the central analysis system may determine that content item 650 has a popularity corresponding to popularity ranking value 611. At time 602, the central analysis system may determine that content item 650 has a popularity corresponding to popularity ranking value 612, which may be a popularity ranking value $r^{-1}$ equal to or less than popularity ranking threshold value 630. As a result, the central analysis system may determine that content item 650 is a modestly popular content item and move content item 650 from hot caching device 402 to medium caching device 401. Subsequently, at time 603, the central analysis system may determine that content item 650 has a popularity corresponding to popularity ranking value 613, which may be a popularity ranking value $r^{-1}$ equal to or less than popularity ranking threshold value 620. As a result, the central analysis system may determine that content item 650 is an unpopular content item and move content item 650 from medium caching device 401 to cool caching device 400.

As illustrated in FIG. 6B, the content router may dynamically redirect a request for content item 650 or portions thereof to cool caching device 400, medium caching device 401, or hot caching device 402 based on where content item 650 is stored at a particular point in time. For example, at time 601, device 403 may request and receive a first portion of content item 650 directly from hot caching device 402. At time 602, the content router may redirect the device's request for a second portion of content item 650 to medium caching device 401. As a result, device 403 may request and receive the second portion of content item 650 directly from medium caching device 401. At time 603, the content router may redirect the device's request for a third portion of content item 650 to cool caching device 400. As a result, device 403 may request and receive the third portion of content item 650 directly from cool caching device 400.

Figure 7:
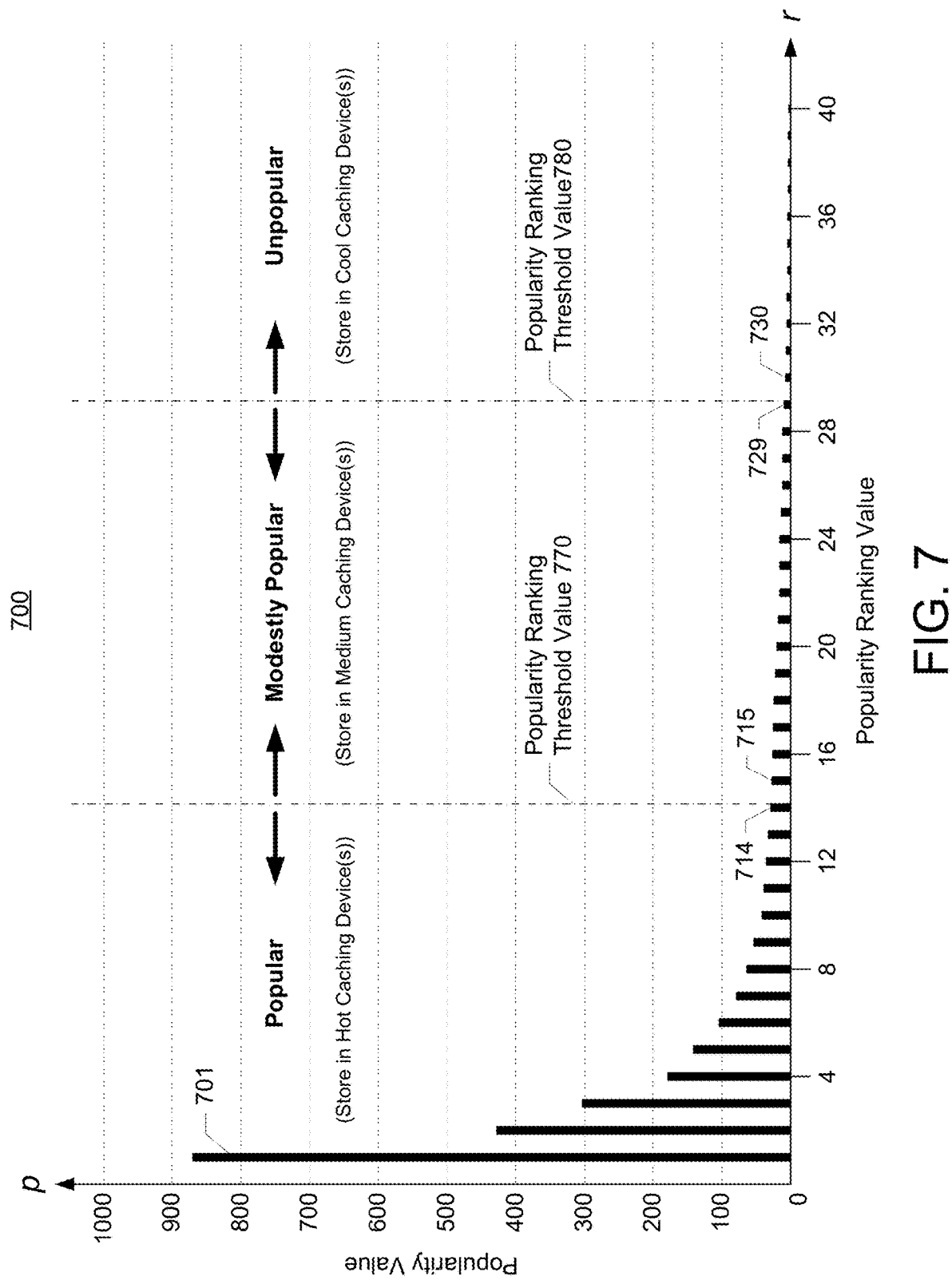
FIG. 7 illustrates an example technique for determining a dynamic threshold value.

FIG. 7 illustrates an exemplary technique for determining a dynamic threshold value. For example, the popularity threshold values, popularity ranking threshold values, or both may be configurable. Graph 700 shows a distribution of requests (or streams) for the content items in the CDN's content library. As illustrated in FIG. 7, the majority of requests are for content items with a popularity ranking value equal to or less than a first popularity ranking threshold value 770 of 14. Therefore, it may be efficient to serve content items 701 to 714 (e.g., the 14 most popular content items) using one or more hot caching devices. It may be efficient to serve content items 715 to 729, which correspond to content items with a popularity ranking value greater than the first popularity ranking threshold value 770 of 14 but less than or equal to a second popularity ranking value 780 of 29, using one or more medium caching devices. It may be efficient to serve content items 730 and the remainder of the content items, which correspond to content items with a popularity ranking value greater than the second popularity ranking value 780 of 29, using a cool caching device.

Graph 700 may change as the size of the CDN's content library grows and the respective popularity ranking values of the content items change. As the information depicted by graph 700 changes, the central analysis system may change one or both of popularity ranking threshold values 770 and 780. For example, popularity ranking threshold values 770 and 780 may be dynamic threshold values based on the number and sizes of the content items in the content library and the number and sizes of the caching devices in the CDN. In an example, if the average size of the content items is X and the size of hot caching device size is Y, the number of content items that may be stored in the hot caching device may be Z=Y/X. The central analysis system may determine that content items with a popularity ranking value less than or equal to a popularity ranking threshold value 770 of Z (e.g., the Z most popular content items) may be popular content items and store them in the hot caching device. Dynamic threshold values may provide the central analysis system or its operator with the ability to tune the CDN for events such as requests storms.

Figure 8:
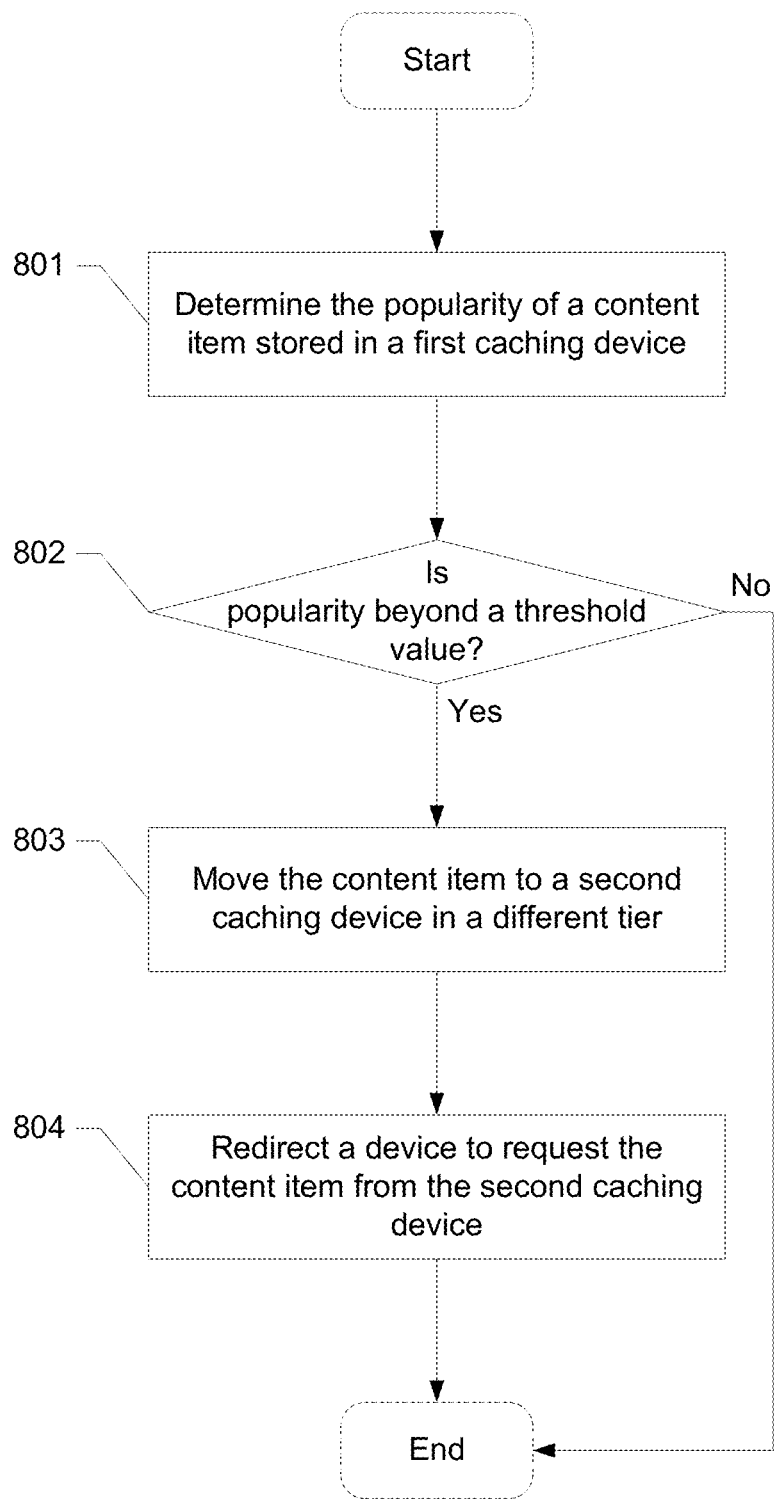
FIG. 8 illustrates an example process flow for providing a content item.

FIG. 8 illustrates an example process flow for providing a content item to a device using a popularity-based distribution hierarchy, such as the popularity-based distribution hierarchy described with reference to FIGS. 4A-4C.

At step 801, the central analysis system determines the popularity of a content item, such as a media content item or other data, stored in a first caching device. The first caching device may be, for example, one of hot caching device 402, medium caching device 401, or cool caching device 400 described with reference to FIGS. 4A-4C, 5A-5B, and 6A-6B.

At step 802, the central analysis system determines whether the popularity of the content item is beyond a threshold value. If the central analysis system determines that a change in the popularity of the content item is above a threshold value, the process may proceed to step 803. If the central analysis system determines that the popularity of the content item is not beyond a threshold value, the process may end and the content item may remain stored in the first caching device.

At step 803, the central analysis system moves the content item to a second caching device in a different popularity tier and deletes it from its original source. At step 804, the central analysis system may cause a device, such as a user device, to be redirected to request the content item from the second caching device.

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed:

1. A method comprising:
 causing, by a computing device, a user device to request, from a first caching device, a first portion of a content item, wherein the first caching device is in a first tier of a hierarchy of caching devices;
 causing, by the computing device and based on determining that a popularity of a second portion of the content item satisfies a first threshold, storage of the second portion of the content item in a second caching device in a second tier of the hierarchy of caching devices, wherein the second tier is different from the first tier, and wherein the first threshold is a dynamic threshold based on a cache size of the second caching device;
 causing, by the computing device, the user device to request, from the second caching device, the second portion of the content item;
 causing, based on determining that a popularity of a third portion of the content item satisfies a second threshold, storage of the third portion of the content item in a third caching device in a third tier of the hierarchy of caching devices, wherein the third tier is different from the second tier; and causing, by the computing device, the user device to request, from the third caching device, the third portion of the content item.

2. The method of claim 1, wherein the second portion is stored in the second caching device, and the third portion is stored in the third caching device, prior to causing the user device to request the first portion.

3. The method of claim 1, wherein the first caching device does not store the second portion or the third portion, wherein the second caching device does not store the first portion or the third portion, and wherein the third caching device does not store the first portion or the second portion.

4. The method of claim 1, further comprising:
after causing storage of the second portion, updating a content index to indicate that the second portion has been stored in the second caching device; and
after causing storage of the third portion, updating the content index to indicate that the content item has been stored in the third caching device.

5. The method of claim 1, wherein each of the caching devices stores a plurality of content items, and wherein the method further comprises:
receiving, from each of the caching devices, respective popularity data for each of the plurality of content items.

6. The method of claim 1, further comprising:
comparing respective proximities of a plurality of caching devices to the user device; and
selecting, based on the respective proximities to the user device, the first caching device, the second caching device, and the third caching device, wherein each of the caching devices are selected for storing different portions of the content item.

7. The method of claim 1, wherein the second portion is not stored in the first caching device, and wherein the first portion is not stored in the second caching device.

8. A system comprising:
a computing device; and
a content router;
wherein the computing device comprises:
one or more first processors; and
first memory storing first instructions that, when executed by the one or more first processors, cause the computing device to:
store, based on determining that a popularity of a second portion of a content item satisfies a first threshold, the second portion of the content item in a second caching device in a second tier of a hierarchy of caching devices, wherein the first threshold is a dynamic threshold based on a cache size of the second caching device;
store, based on determining that a popularity of a third portion of the content item satisfies a second threshold, the third portion of the content item in a third caching device in a third tier of the hierarchy of caching devices, wherein the third tier is different from the second tier; and
wherein the content router comprises:
one or more second processors; and
second memory storing second instructions that, when executed by the one or more second processors, cause the content router to:
receive, from a user device, a first request for a first portion of the content item;

send, to the user device, an indication that the first portion of the content item is stored in a first caching device in a first tier of the hierarchy of caching devices, wherein the first tier is different from the second tier;
receive, from the user device, a second request for the second portion of the content item;
send, to the user device, a first redirect indicating that the second portion of the content item is stored in the second caching device;
receive, from a user device, a third request for the third portion of the content item; and
send, to the user device, a second redirect indicating that the third portion of the content item is stored in the third caching device.

9. The system of claim 8, wherein the first instructions, when executed by the one or more first processors, cause the computing device to:
store the second portion by storing, prior to causing the user device to request the first portion, the second portion in the second caching device, and
store the third portion by storing, prior to causing the user device to request the first portion, the third portion in the third caching device.

10. The system of claim 8, wherein the first caching device does not store the second portion or the third portion, wherein the second caching device does not store the first portion or the third portion, and wherein the third caching device does not store the first portion or the second portion.

11. The system of claim 8, wherein the second instructions, when executed by the one or more second processors, cause the content router to:
after storage of the second portion, update a content index to indicate that the second portion has been stored in the second caching device; and
after storage of the third portion, update the content index to indicate that the content item has been stored in the third caching device.

12. The system of claim 8, wherein each of the caching devices stores a plurality of content items, and wherein the first instructions, when executed by the one or more first processors, cause the computing device to:
receive, from each of the caching devices, respective popularity data for each of the plurality of content items.

13. The system of claim 8, wherein the first instructions, when executed by the one or more first processors, cause the computing device to:
compare respective proximities of a plurality of caching devices to the user device; and
select, based on the respective proximities to the user device, the first caching device, the second caching device, and the third caching device, wherein each of the caching devices are selected for storing different portions of the content item.

14. At least one non-transitory computer readable storage medium storing computer readable instructions which, when executed, cause:
requesting, from a first caching device, a first portion of a content item, wherein the first caching device is in a first tier of a hierarchy of caching devices;
storing, based on determining that a popularity of a second portion of the content item satisfies a first threshold, the second portion of the content item in a second caching device in a second tier of the hierarchy of caching devices, wherein the second tier is different from the first tier, and wherein the first threshold is a dynamic threshold based on a cache size of the second caching device;

requesting, from the second caching device, the second portion of the content item;

storing, based on determining that a popularity of a third portion of the content item satisfies a second threshold, of the third portion of the content item in a third caching device in a third tier of the hierarchy of caching devices, wherein the third tier is different from the second tier; and requesting, from the third caching device, the third portion of the content item.

15. The at least one non-transitory computer readable storage medium of claim 14, wherein the computer readable instructions, when executed, cause storing the second portion by causing storing, prior to causing requesting the first portion, the second portion in the second caching device, and wherein the computer readable instructions, when executed, cause storing the third portion by causing storing, prior to causing requesting the first portion, the third portion in the third caching device.

16. The at least one non-transitory computer readable storage medium of claim 14, wherein the first caching device does not store the second portion or the third portion, wherein the second caching device does not store the first portion or the third portion, and wherein the third caching device does not store the first portion or the second portion.

17. The at least one non-transitory computer readable storage medium of claim 14, wherein the computer readable instructions, when executed, further cause:

after storage of the second portion, updating a content index to indicate that the second portion has been stored in the second caching device; and after storage of the third portion, updating the content index to indicate that the content item has been stored in the third caching device.

18. The at least one non-transitory computer readable storage medium of claim 14, wherein each of the caching devices stores a plurality of content items, and wherein the computer readable instructions, when executed, further cause:

receiving, from each of the caching devices, respective popularity data for each of the plurality of content items.

19. The at least one non-transitory computer readable storage medium of claim 14, wherein the computer readable instructions, when executed, further cause:

comparing respective proximities of a plurality of caching devices to a user device; and selecting, based on the respective proximities to the user device, the first caching device, the second caching device, and the third caching device, wherein each of the caching devices are selected for storing different portions of the content item.

20. The at least one non-transitory computer readable storage medium of claim 14, wherein the computer readable instructions, when executed, cause storing the second portion by causing storing, based on a request from a user device, the second portion.

21. The method of claim 1, wherein the dynamic threshold is based on a size of the content item.

22. The system of claim 8, wherein the dynamic threshold is based on a size of the content item.

23. The at least one non-transitory computer readable storage medium of claim 14, wherein the dynamic threshold is based on a size of the content item.

* * * * *

UNITED STATES PATENT AND TRADEMARK OFFICE
CERTIFICATE OF CORRECTION

PATENT NO. : 10,848,587 B2
APPLICATION NO. : 16/429902
DATED : November 24, 2020
INVENTOR(S) : Richard Fliam et al.

It is certified that error appears in the above-identified patent and that said Letters Patent is hereby corrected as shown below:

In the Specification

Detailed Description, Column 13, Line 25:
Delete "408$a$-1." and insert --408a-l.--

Detailed Description, Column 13, Line 30:
Delete "408$a$-1" and insert --408a-l--

In the Claims

Claim 14, Column 19, Line 8:
Before "the third", delete "of"

Signed and Sealed this
Twenty-first Day of February, 2023

Katherine Kelly Vidal
*Director of the United States Patent and Trademark Office*